United States Patent [19]

Lai

[11] 4,104,254

[45] Aug. 1, 1978

[54] METHOD FOR STABILIZATION OF UV SENSITIVE PLASTICS WITH SUBSTITUTED 1,3-OXAZOLIDINE

[75] Inventor: John Ta-Yuan Lai, Broadview Heights, Ohio

[73] Assignee: The B. F. Goodrich Company, Akron, Ohio

[21] Appl. No.: 856,876

[22] Filed: Dec. 2, 1977

[51] Int. Cl.² .............................................. C08K 5/35
[52] U.S. Cl. .................... 260/45.8 NZ; 260/45.8 NT; 260/307 FA
[58] Field of Search ................................ 260/45.8 NZ

[56] References Cited

U.S. PATENT DOCUMENTS

| | | | |
|---|---|---|---|
| 2,817,663 | 12/1957 | Conlon et al. | 260/45.8 NZ |
| 2,966,472 | 12/1960 | Fiel | 260/45.8 NZ |
| 3,049,509 | 8/1962 | Hardy et al. | 260/45.8 NZ |
| 3,380,959 | 4/1968 | Frump | 260/45.8 NZ |
| 3,770,693 | 11/1973 | Metzger | 260/45.8 NZ |
| 4,012,261 | 3/1977 | Sidi et al. | 260/45.8 NZ |

*Primary Examiner*—Donald E. Czaja
*Assistant Examiner*—R. A. White
*Attorney, Agent, or Firm*—John H. Faro

[57] ABSTRACT

Method for extending the useful life of polymers which are sensitive to photodegradation by ultraviolet light. In this method, the resistance of UV sensitive polymers is enhanced by the incorporation therein of an ultraviolet light stabilizer effective amount of at least one compound of the formula

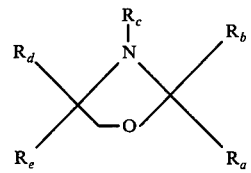

wherein $R_a$, $R_b$, $R_d$, and $R_e$ are independently selected from the group consisting of hydrogen, alkyl of 1 to 6 carbon atoms, cycloalkyl, and aryl; and $R_c$ is hydrogen or hydroxyalkyl.

3 Claims, No Drawings

METHOD FOR STABILIZATION OF UV SENSITIVE PLASTICS WITH SUBSTITUTED 1,3-OXAZOLIDINE

BACKGROUND OF THE INVENTION

1. Field of the Invention

This invention is directed to a method. More specifically, this invention concerns itself with extending the useful life of polymers by enhancement of their resistance to degradation by ultraviolet light.

2. Description of The Prior Art

Polymers have in the past and continue to provide an attractive substitute for the more traditional types of structural materials (e.g., wood and metals) because of relatively inexpensive materials and fabrication costs. As polymers continue to find new applications in, for example, the fabrication of automotive parts and building materials, they must also become more durable and capable of withstanding prolonged exposure to a variety of degradative forces. Degradation of polymers can be caused by exposure to light, heat, moisture and/or air. Such degradation is usually manifest by either a partial or total loss of structural integrity, changes in light transmission properties, changes in color, loss or reduction in flexibility and/or resiliency, or any combination of the above phenomenon. Those attempting to avoid polymer degradation have generally selected from among three possible approaches: (a) elimination or reduction of the degradative forces; (b) isolation of the sensitive polymer material from the degradative forces; or (c) modification of the polymer composition to enhance its resistance to degradative forces. The latter approach is generally preferable since it does not require elaborate engineering or structural changes in the polymer product environment.

There are a variety of additives which have been disclosed as suitable for enhancing the resistance of polymers to one or more of the degradative forces discussed hereinabove. These additives (hereinafter referred to as "stabilizers") can be physically combined with or engrafted upon the environmentally sensitive polymer, thereby prolonging its useful life in the hostile degradative environment. Stabilizers are available which can enhance the polymers resistance to more than one of the degradative forces and conversely, a stabilizer which is effective for prevention of, for example, oxidative degradation may have little if any effect upon the polymers resistance to other degradative agents. Thus, it is not uncommon for polymers to contain a variety of stabilizer materials, each being present for the prevention of a particular degradative reaction.

One of the more difficult to control of the degradative forces is irradiation of the polymer by ultraviolet light. The impact of such irradiation will of course vary depending upon the intensity and duration of exposure and thus may manifest itself only after a prolonged interval. The irradiation of polymers with ultraviolet light can often times cause cross-linking of these materials thereby reducing its resiliency and/or impact resistance. Changes in color and opacity are also often effected by prolonged exposure of the polymer to ultraviolet light. While many materials are known, and commercially available, as stabilizers against ultraviolet light degradation, the degree of protection afforded by such agents is often concentration dependent. The following list of references are illustrative of the various types of ultraviolet absorbers commonly used in conjunction with polymeric materials sensitive to UV photodearadation: U.S. Pat. Nos. 3,362,929; 3,362,930; 3,829,292; 3,901,849; 3,910,918; 3,939,164; published patent application numbers b402,162 and b571,638; U.K. Pat. No. 999,806; and an article appearing in J. Am. Chem. Soc., Vol. 60: 1458 et seq. (1938). In addition, commonly assigned U.S. patent applications Ser. No. 697,345 and 697,387 (both filed on June 18, 1976) disclose compounds which are highly effective as ultraviolet light stabilizers for polymeric materials. The compounds disclosed in the above-referenced pending patent applications are substituted decahydroquinolines and are highly effective in enhancing the resistance of polyolefins to photodegradation by ultraviolet light.

The stabilization of polymeric materials with other heterocyclic compounds, such as oxazolines (also commonly known as "dihydro oxazoles") and oxazolidines (also commonly known as "tetrahydro oxazoles"), has also been previously reported in the open literature. For example, U.S. Pat. No. 3,511,789 discloses the use of oxazolines as foam stabilizers; U.S. Pat. No. 3,703,496 discloses the use of oxazolines as inhibiting the hydrolytic cleavage of phosphite esters and compositions containing phosphite esters and epoxy resins; U.S. Pat. No. 3,380,975 discloses the thermal stabilization of PVC by copolymerization of a vinyl oxazoline monomer and vinyl chloride monomer; and U.S. Pat. No. 3,594,387 discloses the use of 2-imino-oxazolidines as inhibiting the hydrolytic cleavage of simple esters and polyesters. Oxazolines have also been reported in U.S. Pat. No. 3,547,863 as anti-static agents for a variety of polyolefins (e.g., ethylene, propylene, 4-methyl-1-pentene, styrene, isoprene and a variety of their respective copolymers), and in U.S. Pat. No. 3,810,826 as accelerators in the radiation curing (accelerated particulate radiation) of certain polyesters and copolymers of vinyl esters and non-volatile vinyl monomers (e.g., alkenyl aromatics, vinyl carboxylic acids, vinyl nitriles, alkyl and hydroxyalkyl esters of vinyl carboxylic acids, vinyl amides, and mixtures of the foregoing).

In summary, the stabilization of polymers against changes in their physical, chemical and/or electrical properties can be readily achieved by the incorporation of one or more stabilizer compounds within the environmentally unstable host polymer matrix. A variety of such stabilizer agents have been previously disclosed which are specific for the retardation of only one such degradative reaction. As noted herein, oxazolines and oxazolidines are among the materials reported in the literature which are effective for the stabilization of polymers against a number of such degradative forces. However, the disclosure of certain substituted oxazolines as accelerators in a process for radiation curing of certain polymers would tend to suggest that the presence of these substances and structurally similar compounds in polymers can have an unsettling effect upon the host polymer matrix (e.g., the promotion of cross-linking of the host polymer upon the intense exposure of the polymer to electro-magnetic radiation within a certain band width). Thus, the literature discussed hereinabove would lead one to conclude that oxazolines and structurally similar compounds would be undesirable for the stabilization of ultraviolet light sensitive polymers because of such compound's apparent ability to promote radiation initiated curing (cross-linking) of certain polymeric resins.

SUMMARY OF THE INVENTION

My invention involves the unexpected discovery that polymer resins which are sensitive to photodegradation by ultraviolet light can be effectively protected against such photodegradation by the inclusion therein of a UV stabilizer effective amount of at least one oxazolidine compound of the formula

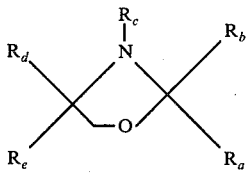

wherein $R_a$, $R_b$, $R_d$ and $R_e$ are independently selected from the group consisting of hydrogen, alkyl of 1 to 6 carbon atoms, cycloalkyl, and aryl; and $R_c$ is hydrogen or hydroxyalkyl.

In one of the preferred embodiments of this invention, the stabilizer compound is present in the host polymer matrix at a concentration in the range of from about two to three parts by weight per 100 parts by weight host polymer.

DESCRIPTION OF THE INVENTION INCLUDING PREFERRED EMBODIMENTS

The compositions suitable for use in the method of this invention can be readily prepared by simply combining a polymer which is sensitive to ultraviolet light degradation and the stabilizer compound(s) under conditions designed for uniform distribution of said compound(s) throughout the polymer. Ordinarily, the concentration of stabilizer in the polymer will range from about 0.05 to 10 parts by weight stabilizer per one hundred parts by weight ultraviolet light sensitive polymer. The preferred content of stabilizer in the polymer compositions of this invention is typically in the range of from about 0.1 part by weight stabilizer per one hundred parts ultraviolet light sensitive polymer to about 1 part by weight stabilizer per one hundred parts by weight ultraviolet light sensitive polymer.

Virtually all polymeric materials are sensitive, at least to some degree, to photodegradation by ultraviolet light. The term "photodegradation" is used throughout this disclosure in reference to ultraviolet light sensitive polymers to describe any photo-induced changes in the physical, chemical, and/or electrical properties caused by such irradiation. Such degradative changes can include cross-linking of the polymer, dehydrohalogenation, reduction in chain length, photo-oxidation, etc. Polymers which are especially sensitive to ultraviolet light degradation are materials which contain unsaturation along their respective backbones, vinyl halide polymers, polyolefins, polyacetaldehydes, polyurethanes, ABS resins, polystyrene, polyacrylonitrile, polycarbonates, polyacrylates, and poly α-substituted acrylates, varnish, phenol-formaldehyde resins, polyepoxides, polyesters, and their respective blends and copolymers. The preferred ultraviolet light sensitive polymers of the composition of this invention are poly-α-mono olefins. Such α-mono olefin monomers used in preparation of the latter polymers include ethylene, propylene, isobutylene, 1-butene, 1-pentene, 1-hexene, 4-methyl-1-pentene, and the like. The stabilizer compounds disclosed herein are especially suitable for use in the retardation of photodegradation of polypropylene.

The stabilizer compounds used in the methods of this invention are, in a number of instances, commercially available or can be readily prepared by techniques disclosed in the open literature, see for example Roberts and Caserio, *Basic Principles of Organic Chemistry*, Sec. 27-11, Synthesis of Polyhetero Ring Systems by 1,3-Cycloaddition, W. A. Benjamin Inc., New York City (1964). The preparation of these stabilizer compounds, briefly stated, will thus generally involve the 1,3 cyclo addition of nitrile ylides and a ketone or an aldehyde under the appropriate conditions. The oxazolidine compound prepared in this manner can be substituted at the 2 and 4 positions, depending upon the materials used in its preparation, or substituted subsequent to its synthesis.

The stabilized compositions prepared according to the method of this invention can also contain, in addition to the stabilizers described hereinabove, a variety of optional ingredients. Such ingredients can include metal oxides, such as zinc, calcium and magnesium oxide; fatty acids such as stearic, lauric acid, and the metal salts thereof; fillers, such as calcium and magnesium carbonate, calcium and barium sulfonates, aluminum silicates, asbestos, and the like; plasticizers and extenders, such as dialkyl and diaryl organic acids, i.e., diisobutyl, diisooctyl, diisodecyl and dibenzyl oleates, stearates, sebacates, azelates, phthalates, and the like; ASTM Type 2 petroleum oils, paraffinic oils, castor oil, tall oil, glycerine, and the like; antioxidants, such as 2,6-di-t-butylparacresol, 2,2'-methylene-bis-(4-ethyl-6-t-butyl phenol), 2,2'-thio-bis(4-methyl-6-t-butyl phenol), 2,2'-methylene-bis-6-t-butyl-4-ethyl phenol, 4,4'-butylidene-6-5-butyl-m-cresol, 2-(4-hydroxy-3,5-di-t-butylanilino-4,6-bis-(octylthio)-1,3,5-triazine, hexahydro-1,3,5-tris-β-(3,5-di-t-butyl-4-hydroxyphenyl)-propionyl-s-triazine, tris-(3,5-di-t-butyl-4-hydroxybenzyl)-isocyanurate, tetrakis-methylene-3(3',5'-di-t-butyl-4'-hydroxyphenyl)propionate methane, distearylthiodipropionate, dilaurylthiodipropionate, tri(nonylphenyl) phosphite, tinthioglycolate, and the like; and other ingredients such as pigments, tackifiers, flame retardants, fungicides, and the like.

Optional compounding ingredients which are especially preferred for use in combination with above stabilized compositions are the antioxidants. The inclusion within the composition of an antioxidant, in addition to the UV stabilizer, confers upon the polymer composition stability against two of the more environmentally hostile degradative forces. The antioxidant can be present within the polymer composition within the range of from about 0.1 to about 10 parts by weight per 100 parts by weight polymer, and preferably from about 0.2 to about 5 parts by weight per 100 parts by weight of polymer. Generally, the phenolic antioxidants are preferred for use in conjunction with the UV stabilized compositions of this invention.

The combination of the oxazolidine stabilizer and a phenolic antioxidant is especially suitable for stabilization of polyolefin polymers; primarily stabilization against degradation by heat, oxygen and ultraviolet light.

Ordinarily, the polymer is compounded with the various types of stabilizer materials in accord with standard mixing techniques and equipment; such as in a Banbury mixer, a Henschel mixer, a rubber mill, an extruder mixer or equivalent device. The various components of the composition may be physically intimately blended either in the absence of or in the presence of a common solvent; or in a solvent which is capable of dissolving the polymer component of the composition yet substantially incapable of dissolving the stabilizer ingredients. Typical of such solvent/dispersing agents include hexane or benzene. Subsequent to intimately dispersing the various components of the composition within one another, the dispersing agent (if any) can be removed by selective evaporation and the resultant resin recovered. The resin may thereafter be formed into useable products by a variety of standard techniques.

The ultraviolet light stability of the compositions of this invention is evaluated by exposing a sample of the composition to a Xenon or carbon arc light in a Weather-Ometer operated at a temperature of about 60° C. Degradation of the sample is monitored periodically by measuring the carbonyl adsorbtion band at 1720 cm$^{-1}$ using an IR spectrophotometer. The relatively rapid formation of carbonyl sites indicates photodegradation of the sample. This test procedure is a recognized method for evaluation of the accuracy of such UV stabilizers and is fully described in the literature, see "Photodegradation, Photooxidation and Photostabilization of Polymers" by Ranby and Raybeck, John Wiley and Sons, New York City (1975) at page 125 et seq., and is also disclosed in U.S. Pat. No. 3,909,493. Photodegradation of the sample can also be manifest by visual cracking of the sample when heated to about 180° C. Oxidative degradation and thermal stability of the sample can also be verified by monitoring the time required to effect discoloration and/or embrittlement of the sample in an aging oven maintained at 140° C.

EXAMPLES

The Examples which follow further define, describe and illustrate the preparation and evaluation of stabilized polymer composition according to the method of this invention. Apparatus and procedures used in the preparation and evaluation of such compositions are standard or as hereinbefore described. Parts and percentages appearing in such Examples are by weight unless otherwise stipulated.

EXAMPLE I

A series of films were prepared (approximately 20 mils thick) from polypropylene (Profax 6501, available from Hercules, Inc., Wilmington, Del.) and (1) devoid of stabilizer additive of any kind; (2) 0.25 parts by weight Irganox 1010 (tetrakis-[methylene(3,5-di-t-butyl-4-hydroxyhydrocinnamode)]), a known antioxidant available from Ciba Geigy Corporation, Ardsley, N.Y.; (3) a stabilizer mixture containing 0.25 parts by weight Irganox 1010 and 0.5 parts by weight Tinuvin 327 (2-[3',5'-di-t-butyl-2'-hydroxyphenyl]-5-chlorobenzotriazole) per 100 parts UV sensitive polymer; (4) a stabilizer mixture having 0.25 parts by weight Irganox 1010 and 0.5 parts by weight N-β-hydroxyethyl-2,2'-diethyl-4,4'-dimethyl-1,3-oxazolidine. These films were prepared by dissolving approximately 200 grams of polypropylene in 300 mls. of benzene together with the desired stabilizing agent(s). The solvent was thereafter evaporated leaving the resinous material. The resinous material was further processed by extrusion using a Brabender extruder operated at 450° F. and at 75 rpm.

Films were prepared from the extruded material by placing a measured amount of the composition between parallel aluminum plates which were maintained at 420° F. The plates were then brought together thereby compressing the sample. The duration of the molding cycle is approximately 3 minutes and the amount of pressure applied approximately 20,000 psig. Heating is continued for only one-third of the compression cycle. A 4-minute cool down period is allowed prior to separation of the aluminum plates. The molded sheet thus obtained is in the range of 10 to 20 mils thick. This sheet is stripped from the aluminum plate and cut into strips approximately 1 × 2 inches and mounted for subsequent testing in an Atlas Model 60-W Weather-Ometer. The Weather-Ometer is operated at 140°-150° F. The sample, upon being placed within this device, was subjected to a Xenon light source and the ultraviolet light degradation thereof observed by monitoring the infrared absorption band of the sample at 1720 cm$^{-1}$ (this band corresponding to carbonyl group formation). A Perkin-Elmer Model 467 IR spectrophotometer was used to monitor carbonyl group formation.

TABLE OF COMPARATIVE RESULTS

| Film Sample | Concentration of Stabilizer | Elapsed Time for Sample Degradation |
|---|---|---|
| Polypropylene film devoid of stabilizer of any kind | — | 245 hours |
| Polypropylene film containing Irganox 1010 | 0.25 phr | 495 hours |
| Polypropylene film containing Irganox 1010 Tinuvin 327 | 0.25 phr 0.5 phr | 1250 hours |
| Polypropylene film containing Irganox 1010 N-β-hydroxyethyl-2,2'-diethyl-4,4'-dimethyl-1,3-oxazollidine | 0.25 phr 0.5 phr | 4000 hours |

As is evident from the above comparative data, the films containing the substituted oxazolidine stabilizer is substantially more resistant to photodegradation by UV than the unstabilized film or the film stabilized with the other conventional ingredients. The above Examples are provided as simply illustrative of some of the preferred embodiments of this invention and not intended to delineate its scope which is set forth in the following claims.

What is claimed is:

1. A method for extending the useful life of polymers which are sensitive to photodegradation by ultraviolet light, said method comprising:

incorporating within said ultraviolet light sensitive polymer a UV stabilizer effective amount of at least one compound of the formula

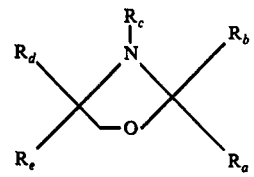

wherein $R_a$, $R_b$, $R_d$ and $R_e$ are independently selected from the group consisting of hydrogen, alkyl of 1 to 6 carbon atoms, cycloalkyl, and aryl; and $R_c$ is hydrogen or hydroxyalkyl.

2. The method of claim 1, wherein the ultraviolet sensitive polymer is an α-mono olefin and the stabilizer compound is N-β-hydroxyethyl-2,2'-diethyl-4,4'-dimethyl-1,3-oxazolidine.

3. The method of claim 1, wherein the stabilizer is a compound of the formula
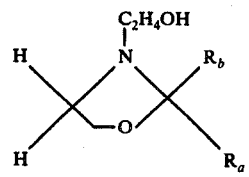
* * * * *